Figures 1, 2:
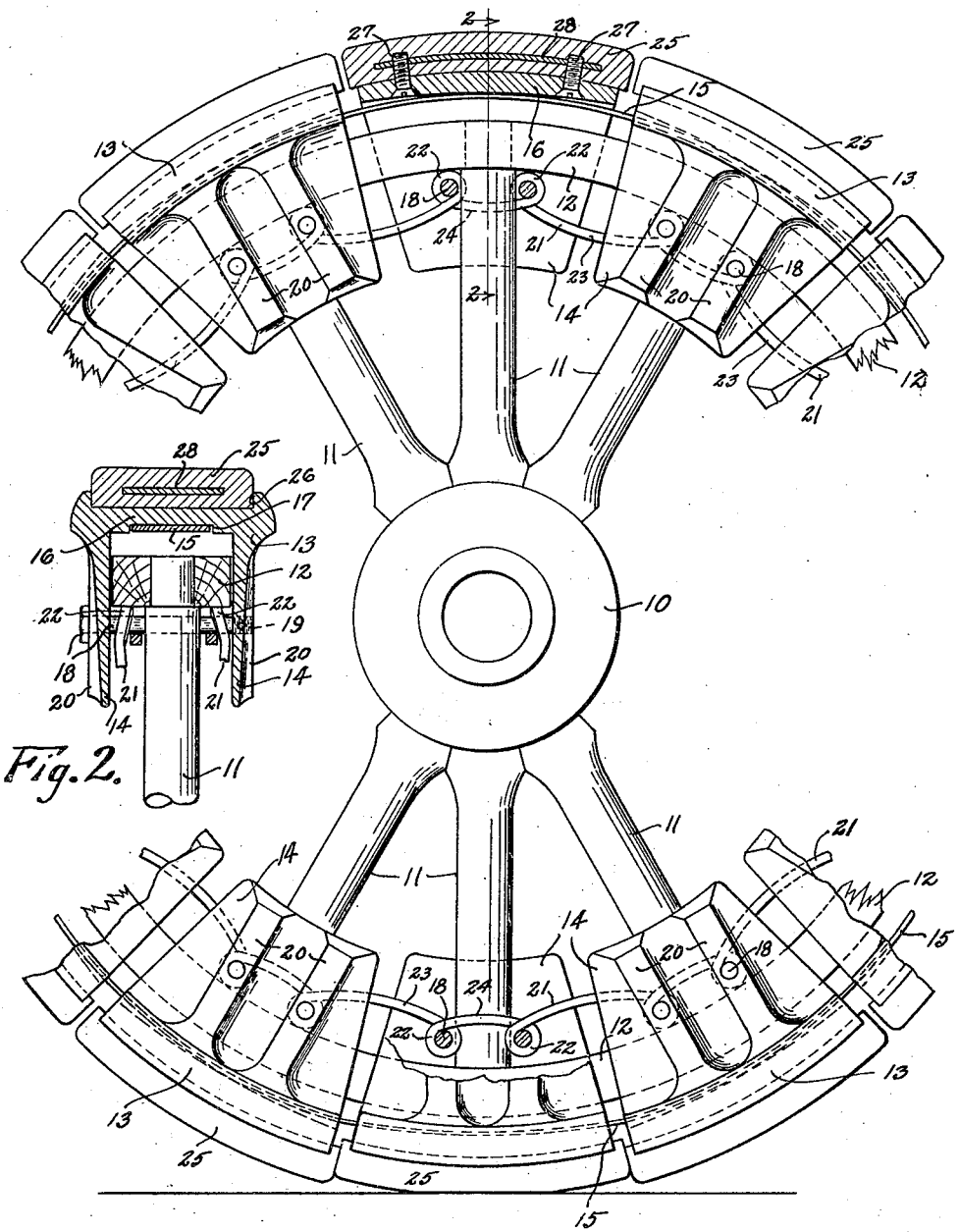

Dec. 26, 1922.

I. WROZINA.
RESILIENT WHEEL TIRE.
FILED SEPT. 20, 1922.

1,439,784

INVENTOR
Ignatius Wrozina
BY
Wooster & Davis
ATTORNEYS.

Patented Dec. 26, 1922.

1,439,784

UNITED STATES PATENT OFFICE.

IGNATIUS WROZINA, OF BRIDGEPORT, CONNECTICUT.

RESILIENT WHEEL TIRE.

Application filed September 20, 1922. Serial No. 589,323.

*To all whom it may concern:*

Be it known that I, IGNATIUS WROZINA, a citizen of Czecho-Slovakia, residing at Bridgeport, county of Fairfield, State of Connecticut, have invented an Improvement in Resilient Wheel Tires, of which the following is a specification.

This invention has for an object to provide an improved resilient tire for vehicle wheels, and one which may be attached to a standard wheel construction without changing this construction.

It is a further object of the invention to provide a tire of this type which will be simple in construction and easily applied to and removed from the wheel to facilitate assembling and repairs.

It is a further object of the invention to provide a resilient tire which will effectively absorb the shocks of the road, and which will be durable and reliable in operation.

With the foregoing and other objects in view, I have devised a construction illustrated in the accompanying drawing, in which—

Fig. 1 is a side elevation of a portion of a wheel with a tire constructed according to my invention applied thereto, portions being broken away to more clearly illustrate the construction thereof, and Fig. 2 is a transverse section substantially on the line 2—2 of Fig. 1.

In the drawing I have illustrated the standard artillery wheel construction comprising the usual hub plates 10 between which the inner ends of the spokes 11 are clamped, and the felly 12 secured to the outer ends of the spokes. My improved tire comprises a series of blocks 13, preferably substantially U-shaped in a cross section, as shown in Fig. 2, the legs 14 of which are adapted to extend on opposite sides of the felly, there being one block provided for each spoke. The blocks, however, do not rest against the outer side of the felly, but are spaced therefrom by a flat spring steel band 15, which is preferably continuous, and rests against the inner surface of the body portion 16, preferably in a groove 17, although this groove is not necessary. The curve or arc on which this bearing surface is formed is of greater radius than the radius of the spring 15, as shown by the cross section of the central block at the top of the wheel in Fig. 1. Thus, the spring 15 rests only against the central portion of the block in the normal position thereof when the wheel is not under load.

Extending between the legs 14 on opposite sides of the corresponding spoke are rods or bolts 18 which may be threaded into one of the legs, as shown at 19 in Fig. 2, or they may project beyond the surface thereof, and have a nut thereon in the usual manner, or both of these methods may be employed if desired. The legs are preferably provided with strengthening ribs 20 through which the bolts extend. Connecting these bolts on opposite sides of the spokes and extending entirely around the wheel, are springs 21. These springs are perfectly square in cross section, and are wrapped once around each bolt, as shown at 22 with inwardly curved arcs 23 and 24 between the bolts, the bolts being so placed that when the blocks are in normal position, and the wheels not under load these loops will rest against the inner wall of the felly, and thus limit the outward movement of the blocks. Or, if the legs are spaced sufficiently, these springs may come outside the felly in which case the felly would rest on the bolts. The springs 21 are preferably continuous and tend to force the blocks outwardly or radially of the wheel, and may be made of different stiffnesses or strengths, depending upon the load which the wheel is designed to carry.

The blocks 13 are also preferably provided on their outer or bearing surfaces with resilient wearing blocks designed to take the direct wear of the road and also provide a certain amount of additional resiliency. These wearing blocks indicated at 25 are preferably made of vulcanized rubber, and also preferably arranged to seat in grooves 26 in the outer wall of the blocks 13, and are designed of such length as to contact with the next adjacent block when it is under maximum load. These wearing blocks of rubber or other suitable material may be secured to the blocks 13 by any suitable means such as screws 27 extending through the body of the block 13 and threaded into a metal plate 28 moulded within the wearing block 25.

When in operation the pull at the top of the wheel, due to the load, will be transferred directly to the springs 21 and through the blocks to the spring 15, and will be distributed throughout the wheel. As the blocks reach the lower part of the wheel, and the pressure from the road is applied to each one, they will yield upwardly against the action of the springs depending upon the pressure imparted to the blocks. These blocks are also allowed a certain amount of rocking movement against the action of the springs, so as to give smooth running qualities. After the block leaves the ground it is forced outwardly to its normal position by the action of the springs.

Having thus set forth the nature of my invention what I claim is:

1. A wheel including a felly, a circumferentially extending spring spaced outwardly of the felly, a plurality of blocks having spaced legs extending on opposite sides of the spring and felly and resting on the outerside of the spring, rods connecting the legs inwardly of the felly, and springs connecting the rods.

2. A wheel including a felly, a circumferentially extending spring spaced outwardly of the felly, a plurality of blocks having spaced legs extending on opposite sides of the spring and felly and resting on the outerside of the spring, rods connecting the legs inwardly of the felly, and a continuous wire spring embracing the rods and connecting the same.

3. A wheel including spokes and a felly secured to the outer ends of the spokes, a circumferentially extending spring spaced outwardly of the felly, a plurality of blocks having spaced legs extending on opposite sides of the spring and felly and resting on the outer side of the spring, transverse rods connecting the legs inwardly of the felly, and a continuous wire spring on opposite sides of the spokes embracing the rods and connecting the same.

4. A wheel including a felly, a flat, circumferentially extending spring spaced outwardly of the felly, a plurality of substantially U-shaped blocks with their legs extending by the opposite edges of the spring and felly, the body of each block having an inner curved surface resting on the outer side of the spring and of a greater radius than that of the spring, rods connecting the legs inwardly of the felly, and a circumferentially extending wire spring connecting the rods and tending to force the blocks outwardly.

5. A wheel including spokes and a felly secured thereto, a flat, circumferentially extending spring spaced outwardly of the felly, a plurality of substantially U-shaped blocks with their legs straddling the spring and felly, the body of each block having an inner curved surface resting against the outerside of the spring and of a greater radius than that of the spring, rods connecting the legs inwardly of the felly, and circumferentially extending springs on opposite sides of the spokes embracing the rods and connecting the same, said springs tending to move the blocks radially outward.

6. A wheel including a felly, a circumferentially extending spring spaced outwardly of the felly, a plurality of blocks having spaced legs extending on opposite sides of the spring and felly and resting on the outerside of the spring, and springs connecting the blocks inwardly of the felly and tending to force the blocks outwardly.

In testimony whereof I affix my signature.

IGNATIUS WROZINA.